United States Patent
Stammberger et al.

(10) Patent No.: US 10,942,062 B2
(45) Date of Patent: Mar. 9, 2021

(54) APPARATUS FOR ADDITIVELY MANUFACTURING OF THREE-DIMENSIONAL OBJECTS

(71) Applicant: CL SCHUTZRECHTSVERWALTUNGS GMBH, Lichtenfels (DE)

(72) Inventors: Jens Stammberger, Rödental (DE); Daniel Winiarski, Bad Staffelstein (DE); Christian Diller, Lichtenfels (DE); Ralf Hetzel, Bad Staffelstein (DE)

(73) Assignee: CL SCHUTZRECHTSVERWALTUNGS GMBH, Lichtenfels (DE)

( * ) Notice: Subject to any disclaimer, the term of this patent is extended or adjusted under 35 U.S.C. 154(b) by 468 days.

(21) Appl. No.: 15/812,513

(22) Filed: Nov. 14, 2017

(65) Prior Publication Data
US 2018/0136037 A1    May 17, 2018

(30) Foreign Application Priority Data

Nov. 14, 2016    (DE) .......................... 102016121803.0

(51) Int. Cl.
*B29C 64/153*    (2017.01)
*B22F 3/105*    (2006.01)
(Continued)

(52) U.S. Cl.
CPC .......... *G01J 1/4257* (2013.01); *B22F 3/1055* (2013.01); *B29C 64/153* (2017.08); *B29C 64/20* (2017.08);
(Continued)

(58) Field of Classification Search
CPC . G01J 1/4257; G01J 2001/0285; B29C 64/20; B29C 64/393; B29C 64/153;
(Continued)

(56) References Cited

U.S. PATENT DOCUMENTS

| | | | |
|---|---|---|---|
| 10,444,068 B2* | 10/2019 | Philippi | ................ B29C 64/135 |
| 2006/0060754 A1* | 3/2006 | Stiens | ..................... H01L 37/00 |
| | | | 250/214.1 |

(Continued)

FOREIGN PATENT DOCUMENTS

| | | |
|---|---|---|
| DE | 102010026139 A1 | 1/2012 |
| DE | 102011009624 A1 | 8/2012 |

(Continued)

*Primary Examiner* — Nahida Sultana
(74) *Attorney, Agent, or Firm* — Dority & Manning, P.A.

(57) ABSTRACT

An apparatus (1) for additive manufacturing of three-dimensional objects (2) by successive, selective layer-by-layer exposure and thus successive, selective layer-by-layer solidification of construction material layers of a construction material (3) that can be solidified by means of laser radiation in a process chamber (10) of the apparatus, comprising an exposure device (5) provided for generating laser radiation for selective exposure and thus selective solidification of respective construction material layers, and a detection device (11) provided for detecting the entering of laser radiation into a process chamber limiting element at least partially limiting the process chamber (10) and/or for detecting the penetration of laser radiation through a process chamber limiting element at least partially limiting the process chamber (10).

12 Claims, 3 Drawing Sheets

Figure 1:
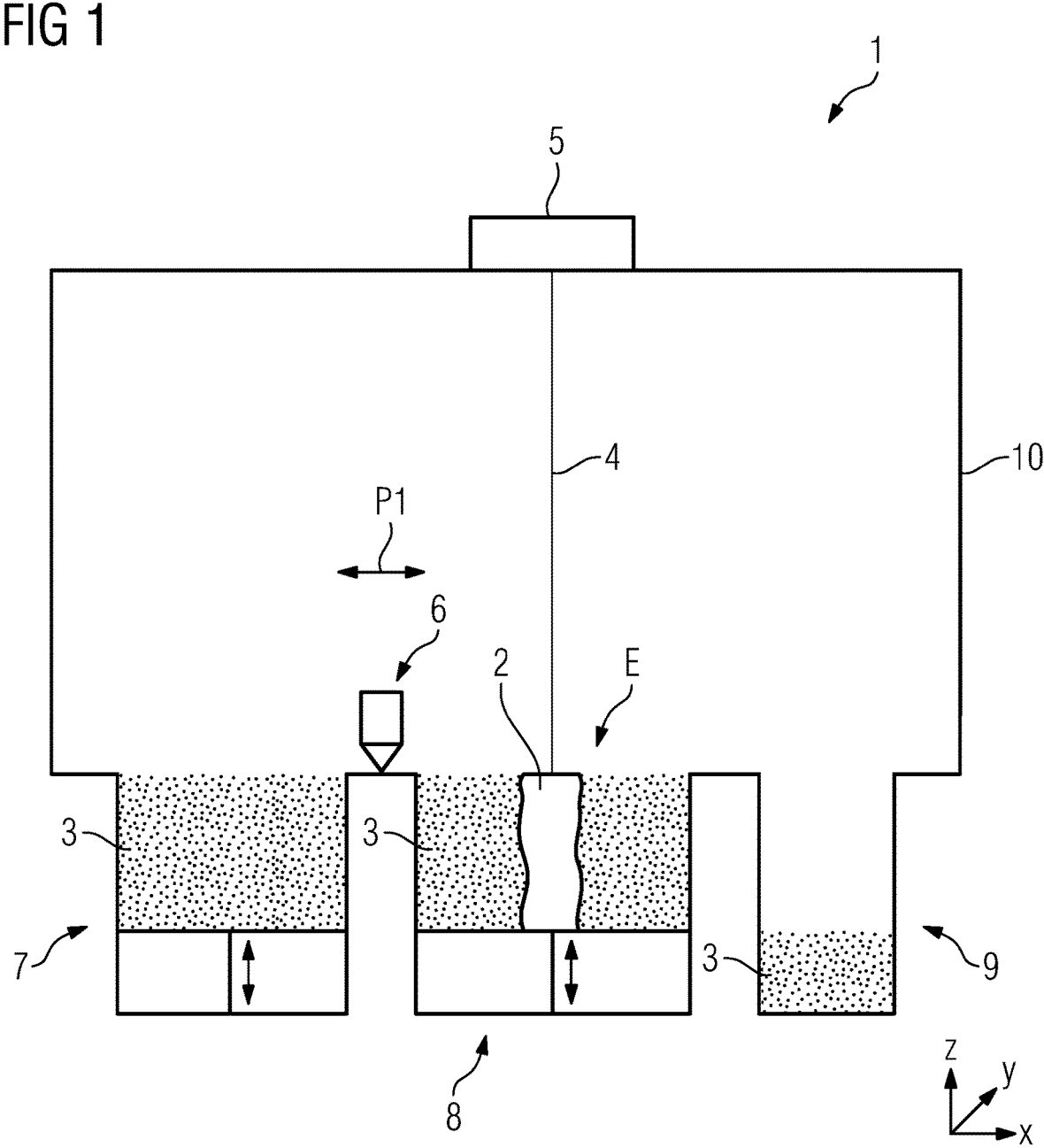

(51) Int. Cl.
*B33Y 30/00* (2015.01)
*B29C 64/268* (2017.01)
*G01J 1/42* (2006.01)
*B33Y 10/00* (2015.01)
*B33Y 50/02* (2015.01)
*B29C 64/393* (2017.01)
*B29C 64/20* (2017.01)
*G01J 1/02* (2006.01)

(52) U.S. Cl.
CPC .......... *B29C 64/268* (2017.08); *B29C 64/393* (2017.08); *B33Y 10/00* (2014.12); *B33Y 30/00* (2014.12); *B33Y 50/02* (2014.12); *G01J 2001/0285* (2013.01)

(58) Field of Classification Search
CPC ....... B29C 64/268; B33Y 30/00; B33Y 50/02; B33Y 10/00; B22F 3/1055; B22F 2003/1056; B28B 1/001; B28B 2003/1056
See application file for complete search history.

(56) References Cited

U.S. PATENT DOCUMENTS

| | | | |
|---|---|---|---|
| 2010/0277736 | A1 | 11/2010 | Goebel |
| 2011/0061591 | A1* | 3/2011 | Stecker ................ B22F 3/1055 118/663 |
| 2014/0265047 | A1* | 9/2014 | Burris ................ B23K 26/0608 264/497 |
| 2015/0048075 | A1 | 2/2015 | Pedrosa et al. |
| 2015/0130100 | A1* | 5/2015 | Fiegener ............... B29C 64/393 264/40.1 |
| 2015/0177158 | A1 | 6/2015 | Cheverton |
| 2016/0144571 | A1 | 5/2016 | Philippi |
| 2016/0236279 | A1 | 8/2016 | Ashton et al. |
| 2017/0144223 | A1* | 5/2017 | Gold ...................... B33Y 50/02 |
| 2017/0146382 | A1* | 5/2017 | Gold ...................... B33Y 50/02 |
| 2017/0239892 | A1* | 8/2017 | Buller .................. B23K 26/342 |
| 2017/0282400 | A1* | 10/2017 | Jie ......................... B28B 1/001 |
| 2017/0297261 | A1* | 10/2017 | Schultheiss ............ B33Y 30/00 |
| 2017/0341183 | A1* | 11/2017 | Buller ................... B29C 64/393 |
| 2018/0126650 | A1* | 5/2018 | Murphree ............. B29C 64/371 |
| 2018/0195898 | A1* | 7/2018 | Gold ................. G02B 19/0047 |
| 2019/0061249 | A1* | 2/2019 | Lee ........................ B33Y 30/00 |
| 2019/0134906 | A1* | 5/2019 | Ferris ..................... B33Y 10/00 |
| 2019/0255766 | A1* | 8/2019 | Takeyama ............. B29C 64/118 |
| 2019/0283332 | A1* | 9/2019 | Brown ................... B29C 64/393 |
| 2020/0004225 | A1* | 1/2020 | Buller ............... G05B 19/4099 |

FOREIGN PATENT DOCUMENTS

| | | |
|---|---|---|
| DE | 102014012286 A1 | 2/2016 |
| DE | 102015000102 A1 | 7/2016 |
| DE | 102015207834 A1 | 11/2016 |
| EP | 2598313 B1 | 8/2015 |
| JP | 2015501369 A | 1/2015 |
| WO | WO2015/003937 A1 | 1/2015 |
| WO | WO2015/040433 A2 | 3/2015 |
| WO | WO 2016/094827 A1 | 6/2016 |

* cited by examiner

APPARATUS FOR ADDITIVELY MANUFACTURING OF THREE-DIMENSIONAL OBJECTS

CROSS-REFERENCE TO RELATED APPLICATIONS

This application claims priority to German Patent Application serial no. 10 2016 121 803.0 filed Nov. 14, 2016, the contents of which is incorporated herein by reference in its entirety as if set forth verbatim.

The invention relates to an apparatus for additive manufacturing of three-dimensional objects by successive, selective layer-by-layer exposure and thus successive, selective layer-by-layer solidification of construction material layers of a construction material that can be solidified by means of laser radiation in a process chamber of the apparatus, comprising an exposure device provided for generating laser radiation for the selective exposure and thus selective solidification of respective construction material layers.

Such apparatuses for additive manufacturing of three-dimensional objects are per se known. Examples for respective apparatuses include apparatuses for performing selective laser melting methods (SLM methods) and apparatuses for performing selective laser sintering methods (SLS methods).

It is known that in the operation of respective apparatuses laser radiation, especially secondary radiation reflected from a construction plane, can hit on process chamber limiting elements, i.e. especially process chamber wall elements, which might be a potential safety risk.

Until now, this potential safety risk is typically addressed by a specific reinforcement of respective process chamber limiting elements, i.e. especially a specific increase of the wall thickness of respective process chamber wall elements. An active detection of laser radiation hitting on process chamber limiting elements is not intended.

The invention is based on the object of providing, in contrast to the above, an improved apparatus for manufacturing of three-dimensional objects.

The object is solved by an apparatus for additive manufacturing of three-dimensional objects according to claim 1. The dependent claims relate to possible embodiments of the apparatus.

The apparatus described herein ("apparatus") is provided for additive manufacturing of three-dimensional objects, i.e., for example, technical components or technical component groups, by successive, selective layer-by-layer exposure and thus successive, selective layer-by-layer solidification of construction material layers of a construction material that can be solidified by means of laser radiation in the sections corresponding to the layer-related cross-section of the object to be manufactured. The construction material can be a particulate or powdered metal material, plastic material, and/or ceramic material. The selective solidification of respective construction material layers to be selectively solidified is carried out based on object-related construction data. Respective construction data describe the geometric structural design of the respective object to be additively manufactured and can, for example, include "sliced" CAD data of the object to be additively manufactured. The apparatus can be formed as an SLM apparatus, i.e. as an apparatus for performing selective laser melting methods (SLM methods), or as an SLS apparatus, i.e. as an apparatus for performing selective laser sintering methods (SLS methods).

The apparatus comprises the functional components typically required for performing additive construction processes. This especially involves a coating device and an exposure device. The coating device is provided for forming construction material layers to be selectively exposed or to be selectively solidified in a construction plane of the apparatus, in which the successive, selective layer-by-layer exposure and thus the successive, selective layer-by-layer solidification of construction material layers of the construction material that can be solidified by means of laser radiation is carried out. The exposure device is provided for the selective exposure of construction material layers to be selectively solidified in the construction plane of the apparatus.

The exposure device typically comprises a beam generation device provided for generating laser radiation, i.e. a laser beam, possibly a beam deflection device (scanner device) provided for deflecting an energy or laser beam generated by the beam generation device to a section to be exposed, of a construction material layer to be selectively solidified, and various optical elements, such as filter elements, objective elements, lens elements, etc.

The functional components of the apparatus mentioned are typically arranged or formed on or in an inertable process chamber of the apparatus. The process chamber is spatially-physically limited or defined by process chamber limiting elements, process chamber limits in short. Respective process chamber limiting elements can especially be process chamber wall elements, process chamber walls in short. The process chamber typically comprises docking interfaces provided for docking of powder modules, i.e., for example, construction, metering or overflow modules.

Specifically, a process chamber limiting element can be a process chamber wall element at least partially limiting the process chamber, or a process chamber window element enabling viewing into the process chamber, or a process chamber door element creating an access opportunity into the process chamber, movably, especially swivellingly, supported, especially between an open position and a closing position. A respective process chamber window element can be a component of a respective process chamber wall element or a respective process chamber door element.

The apparatus comprises a detection device provided for detecting the entering of laser radiation into a process chamber limiting element at least partially limiting the process chamber and/or for detecting the penetration of laser radiation through a process chamber limiting element at least partially limiting the process chamber. The primary radiation exiting the exposure device can, in performing additive construction processes, be reflected such that it at least partially enters into or penetrates a process chamber limiting element at least partially limiting the process chamber. The laser radiation that can be detected by the detection device is thus typically secondary radiation reflected by an e.g. object portion already manufactured. The detection device enables an active detection of the at least partial entering of laser radiation into respective process chamber limiting elements and/or of the at least partial detection of the penetration of laser radiation through respective process chamber limiting elements, consequently, an active detection of laser radiation hitting on individual, several, or all process chamber limiting elements. The detection device is thus a measure to increase the safety of the apparatus.

The detection device comprises at least one detection element, i.e., possibly several detection elements. Specific examples of respective detection elements are given below:

A respective detection element can be provided for (directly or indirectly) detecting laser radiation entering into a process chamber limiting element and/or penetrating a process chamber limiting element, especially laser radiation of certain radiation properties, preferably of a certain wavelength. A respective detection element can, e.g., be formed as a sensor technology, possibly comprising light-conducting structure elements, for detecting laser radiation, especially laser radiation of certain radiation properties, preferably of a certain wavelength.

A respective detection element can also be provided for detecting a physical property that can be at least partially changed related to laser radiation, especially an electric or thermal property that can be at least partially changed related to laser radiation, of a process chamber limiting element. A respective detection element can e.g. be formed as a sensor technology for detecting changes of the electric properties, especially the conductivity, or changes of the thermal properties, especially the temperature, of a process chamber limiting element. Changes of certain physical properties of a process chamber limiting element, i.e., for example, changes of the electric or thermal properties, refer to or indicate a (potential) entering of laser radiation into a process chamber limiting element or a (potential) penetration of laser radiation through a process chamber limiting element.

A respective detection element can also be provided for detecting an atmosphere changeable by a material removal of a process chamber limiting element related to laser radiation within the process chamber. A respective detection element can, e.g., be provided within the process chamber as a sensor technology for detecting an atmosphere and atmospheric composition, respectively, changeable by a material removal of a process chamber limiting element related to laser radiation. Changes of the atmosphere, e.g. by an increase of the concentration of certain elements resulting from a corresponding material removal of a process chamber limiting element, refer to or indicate a (potential) entering of laser radiation into a process chamber limiting element or a (potential) penetration of laser radiation through a process chamber limiting element.

A respective detection element can also be provided for detecting particles arising from a material removal of a process chamber limiting element related to laser radiation, especially process chamber limiting element particles. A respective detection element can, e.g., be provided as a sensor technology for detecting particles arising from a material removal of a process chamber limiting element related to laser radiation, especially process chamber limiting element particles (independent of a concomitant possible change of the atmosphere within the process chamber). Detected particles arising from a material removal of a process chamber limiting element related to laser radiation also refer to or indicate a (potential) entering of laser radiation into a process chamber limiting element or a (potential) penetration of laser radiation through a process chamber limiting element.

A respective detection element can directly be arranged or formed on or in a process chamber limiting element.

It is, e.g., conceivable that a detection element is arranged or formed on an inner surface of a process chamber limiting element facing the interior space limited by the process chamber, or is arranged or formed on an, especially exposed, outer surface of a process chamber limiting element facing away from the interior space limited by the process chamber. The detection element can thus be arranged or formed on a respective inside or outside surface of a process chamber limiting element, representing a comparatively simple possibility for attaching a detection element (independent of the geometric-structural design thereof), which possibly enables an upgrading of apparatuses originally not equipped with a detection device.

When a detection element is arranged or formed in a process chamber limiting element, it is conceivable that the detection element is arranged or formed in a process chamber limiting element at least partially having a multi-layered design, wherein it is arranged or formed, especially as intermediate layer, between two external layers of the process chamber limiting element in the process chamber limiting element. The detection element can thus be directly integrated in the process chamber limiting element, whereby it is protected from external influences. For this purpose, the detection element especially has a flat or plane geometric structural design.

Alternatively or complementary to a direct layout or forming of a detection element on or in a process chamber limiting element, a detection element can be arranged or formed on or in an, especially housing-like or housing-shaped, carrying structure that can be arranged or is arranged as a separate component group on or in a process chamber limiting element. In the simplest case, a carrying structure can form a kind of a housing, on or in which at least one detection element is arranged or formed. In the carrying structure, further components of the detection device, i.e., for example, connection interfaces, e.g. for connecting an energy supply, data transfer interfaces, e.g. for transferring, i.e. for sending and/or receiving of data, etc., can be integrated.

A respective carrying structure can, e.g., be arranged or formed on an, especially exposed, inner surface of a process chamber limiting element facing the interior space limited by the process chamber, or can be arranged or formed on an, especially exposed, outer surface of a process chamber limiting element facing away from the interior space limited by the process chamber. A carrying structure can thus be arranged or formed on an appropriate inside or outside surface of a process chamber limiting element, representing a comparatively simple possibility for attaching a carrying structure (independent of the geometric-structural design thereof), which possibly enables an upgrading of apparatuses originally not equipped with a detection device.

A respective carrying structure can at least partially have a multi-layered design, wherein the or at least one detection element is arranged or formed, especially as intermediate layer, between two external layers of the carrying structure in the carrying structure. Consequently, a detection element can be arranged or formed in a carrying structure at least partially having a multi-layered design, wherein it is, especially as an intermediate layer, arranged or formed between two external layers of the carrying structure in the carrying structure, whereby it is protected from external influences. For this purpose, the detection element, in turn, has especially a flat or plane geometric structural design.

The detection device can (with regard to data transfer) communicate with a control device controlling the operation of the exposure device and/or the (entire) apparatus, wherein the detection device, in detecting an entering of laser radiation into a process chamber limiting element at least partially limiting the process chamber and/or in detecting a penetration of laser radiation through a process chamber limiting element at least partially limiting the process chamber, is provided for generating detection information and for communicating this to the control device. Regarding both the detection device and the control device, suitable communication interfaces are present, enabling a transfer of detection information from the detection device to the control device.

The control device can be provided to (instantly) perform, on receipt of the respective detection information, at least one action to prevent the laser radiation from entering into the process chamber limiting element at least partially limiting the process chamber and/or to prevent the laser radiation from at least partially penetrating the process chamber limiting element at least partially limiting the process chamber. An appropriate action can be to reduce the performance of the laser radiation generated by the exposure device, to switch off the exposure device, or to switch off the entire apparatus.

The detection device can communicate with an output device for outputting information, especially to a user, wherein the detection device, in detecting an entering of laser radiation into a process chamber limiting element at least partially limiting the process chamber and/or in detecting a penetration of laser radiation through a process chamber limiting element at least partially limiting the process chamber, is provided for generating detection information and for communicating this to the output device. The detection device and/or the output device can be provided to generate warning information relating to the detection information and to output it to a user.

An output of respective information can be understood as a direct output of, especially acoustic and/or optical, signals relating to the respective information to a user, for what the apparatus has suitable signal output devices, i.e., for example, display devices, speaker devices, etc. An output of respective information can also be understood as an, especially radio-based, transfer of respective information to at least one user (mobile) end device, i.e., for example, a computer, a mobile phone, a smart phone, a tablet computer, etc., for what the apparatus has suitable data transfer interfaces, i.e., for example, transmitting devices.

Figure 2:
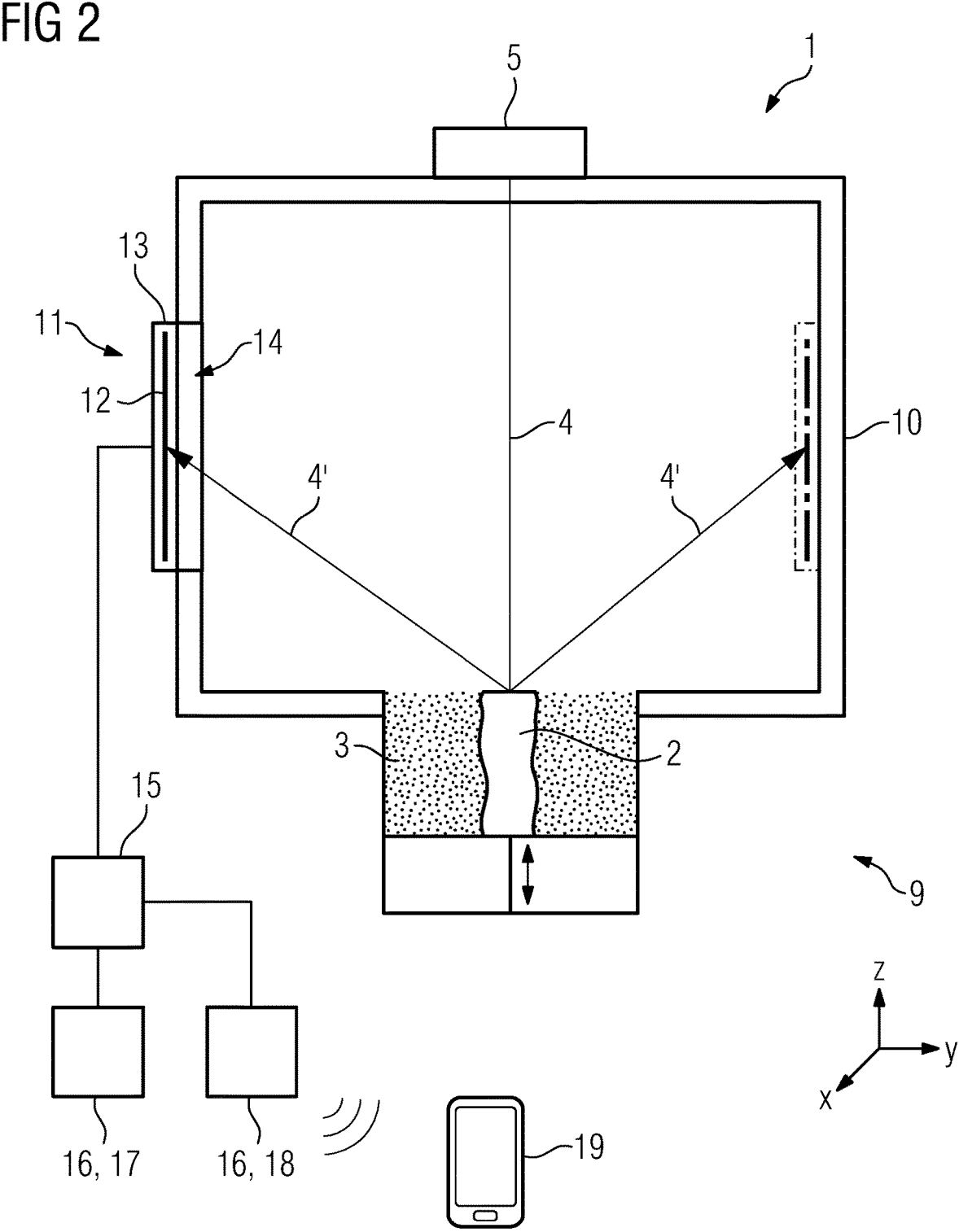
Figure 3:
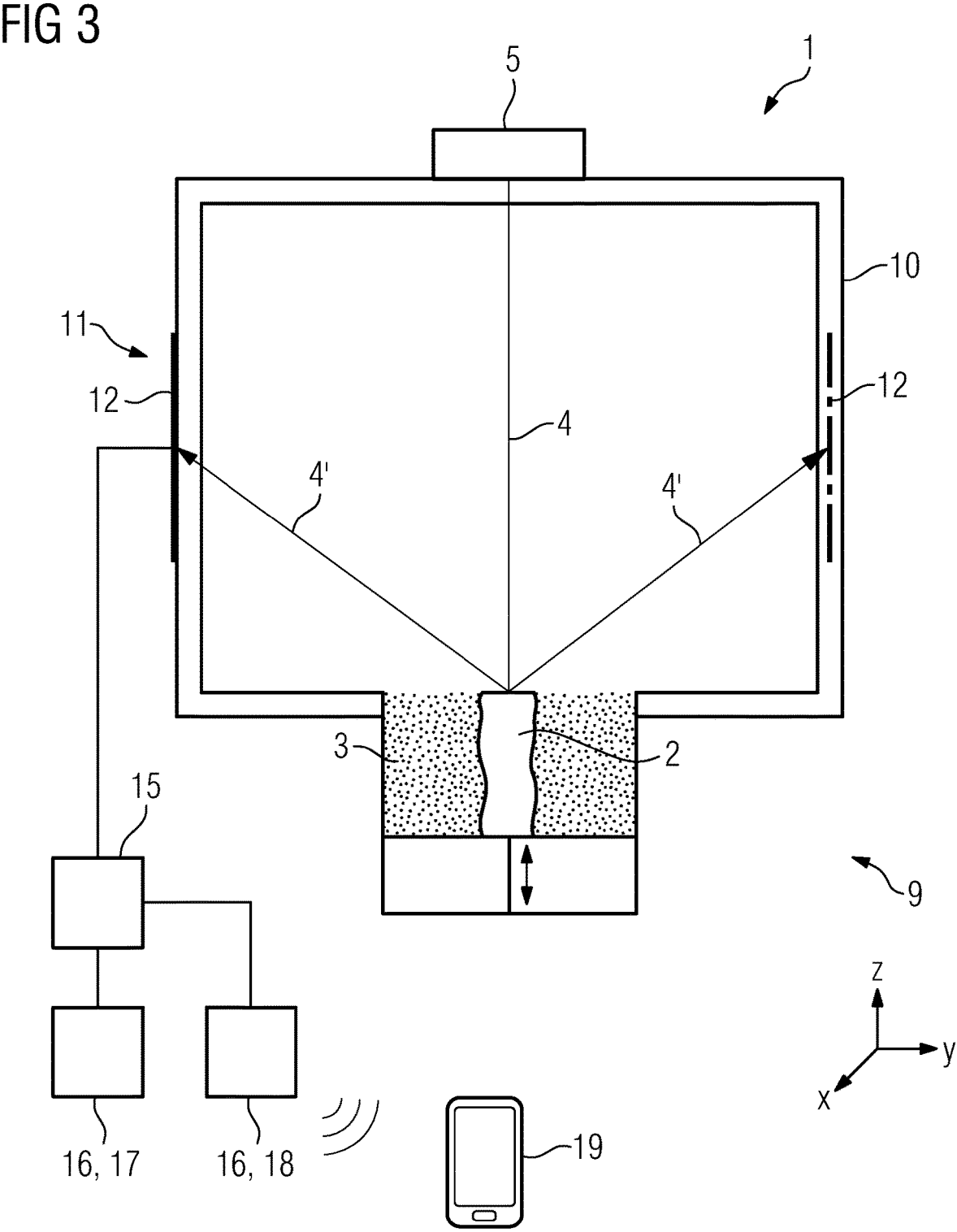

The invention is explained in more detail by means of exemplary embodiments in the figures of the drawings. In which:

FIG. 1 shows a schematic diagram of an apparatus according to an exemplary embodiment;

FIGS. 2, 3 each show a detail of the apparatus shown in FIG. 1.

FIG. 1 shows a schematic diagram of an apparatus 1 according to an exemplary embodiment of the apparatus 1.

The apparatus 1 serves the additive manufacturing of three-dimensional objects 2, i.e. especially technical components or technical component groups, by successive, selective layer-by-layer exposure and thus successive, selective layer-by-layer solidification of construction material layers of a construction material 3, i.e., for example, a metal powder, which can be solidified by means of laser radiation, cf. laser beam 4. The selective solidification of respective construction material layers to be solidified is carried out based on object-related construction data. Respective construction data describe the geometric or geometric structural design of the respective object 2 to be additively manufactured and can, for example, include "sliced" CAD data of the object 2 to be manufactured. The apparatus 1 can be formed as a Laser-CUSING® apparatus, i.e. as an apparatus for performing selective laser melting methods.

The apparatus 1 comprises the functional components required for performing additive construction processes; in FIG. 1, for example, a coating device 5 and an exposure device 6 are shown.

The coating device 5 is provided for forming construction material layers in a construction plane E of the apparatus 1 to be selectively exposed or to be selectively solidified. The coating device 5 comprises a coating element assembly (not denoted in more detail) comprising several coating elements, which is movably supported in a horizontal direction, as indicated by the double arrow P1, via a guiding device (not shown).

The exposure device 6 is provided for the selective exposure of construction material layers to be selectively solidified in the construction plane E of the apparatus 1 and for that purpose comprises a beam generation device (not shown) provided for generating a laser beam 4, possibly a beam deflection device (not shown) provided for deflecting a laser beam 5 generated by the beam generation device to a section to be exposed, of a construction material layer to be selectively solidified, and various optical elements, such as filter elements, objective elements, lens elements, etc.

In FIG. 1, a metering module 7, a construction module 8, and an overflow module 9 are further illustrated, which are docked to a lower section of an inertable process chamber 10 of the apparatus 1. The modules mentioned can also form a lower section of the process chamber 10.

The process chamber 10 is limited by individual process chamber limiting elements or process chamber wall elements (not denoted in more detail).

The apparatus 1 comprises a detection device 11—only shown in FIGS. 2, 3, although also present in the apparatus 1 shown in FIG. 1—provided for detecting the entering of laser radiation into a process chamber limiting element at least partially limiting the process chamber 10 and/or for detecting the penetration of laser radiation through a process chamber limiting element at least partially limiting the process chamber 10. The primary radiation, cf. laser beam 4, exiting the exposure device 5 can, in performing additive construction processes, be reflected such that it at least partially enters into or penetrates a process chamber limiting element at least partially limiting the process chamber 10. The laser radiation that can be detected by the detection device 11 is thus typically secondary radiation, cf. laser beam 4, reflected by an, e.g., object portion already manufactured.

The detection device 11 comprises one or more detection element(s) 12 provided for detecting the entering of laser radiation into a process chamber limiting element at least partially limiting the process chamber 10 and/or for detecting the penetration of laser radiation through a process chamber limiting element at least partially limiting the process chamber 10.

In the exemplary embodiment shown in FIG. 2, a detection element 12 is arranged in a housing-like carrying structure 13 that can be arranged or is arranged as a separate component group on or in a process chamber limiting element. The carrying structure 13 can at least partially have a multi-layered design, wherein the detection element 12 is arranged, especially as an intermediate layer, between two external layers (not denoted in more detail) of the carrying structure 13 in the carrying structure 13. The carrying structure 13 can form a housing, in which the detection element 12 is arranged. In the carrying structure 13, further components (not shown) of the detection device 11, i.e., for example, connection interfaces, e.g. for connecting an energy supply, data transfer interfaces, e.g. for transferring, i.e. for sending and/or receiving of data, etc., can be integrated.

In the exemplary embodiment shown in FIG. 2, the carrying structure 13 is exemplarily arranged on or in a process chamber window element 14 enabling viewing into the process chamber 10. The process chamber window element 14 can be an integral part of a process chamber door element creating an access opportunity into the process chamber 10, movably, especially swivellingly, supported, especially between an open position and a closing position.

Shown in a dashed-and-dotted line, since optional, is another carrying structure 13 arranged on an inner surface of a process chamber limiting element facing the interior space limited by the process chamber 10. An arrangement of another carrying structure 13 on an outer surface of a process chamber limiting element facing away from the interior space limited by the process chamber 10 would also be conceivable.

In the exemplary embodiment shown in FIG. 3, a detection element 12 is arranged directly on or in a process chamber limiting element.

The detection element 12 is arranged on an outer surface of a process chamber limiting element facing away from the interior space limited by the process chamber 10.

Shown in a dashed-and-dotted line, since optional, is another detection element 12, which is directly integrated in a process chamber limiting element. The detection element 12 can be arranged or formed in a process chamber limiting element at least partially having a multi-layered design, wherein it can be arranged, especially as an intermediate layer, between two external layers of the process chamber limiting element in the process chamber limiting element. Again, an arrangement of another detection element 12 on an inner surface of a process chamber limiting element facing the interior space limited by the process chamber 10 would also be conceivable.

It applies to all exemplary embodiments that a respective detection element 12 can be provided for (directly or indirectly) detecting laser radiation entering into a process chamber limiting element and/or penetrating a process chamber limiting element, especially laser radiation of certain radiation properties, preferably of a certain wavelength. A respective detection element 12 can, e.g., be formed as a sensor technology, possibly comprising light-conducting structure elements, for detecting laser radiation, especially laser radiation of certain radiation properties, preferably of a certain wavelength.

A respective detection element 12 can also be provided for detecting a physical property that is at least partially changeable related to laser radiation, especially an electric or thermal property that is at least partially changeable related to laser radiation, of a process chamber limiting element. A respective detection element 12 can, e.g., be formed as a sensor technology for detecting changes of the electric properties, especially the conductivity, or changes of the thermal properties, especially the temperature, of a process chamber limiting element.

A respective detection element 12 can also be provided within the process chamber 10 for detecting an atmosphere that is changeable by a material removal of a process chamber limiting element related to laser radiation. A respective detection element 12 can be provided within the process chamber 10, e.g., as sensor technology for detecting an atmosphere and an atmospheric composition, respectively, that is changeable by a material removal of a process chamber limiting element related to laser radiation.

A respective detection element 12 can also be provided for detecting particles arising from a material removal of a process chamber limiting element related to laser radiation, especially process chamber limiting element particles. A respective detection element 12 can, e.g., be provided as a sensor technology for detecting particles arising from a material removal of a process chamber limiting element related to laser radiation, especially process chamber limiting element particles (independent of a concomitant possible change of the atmosphere within the process chamber 10).

It further applies to all exemplary embodiments that the detection device 11 (with regard to data transfer) can communicate with a control device 15 controlling the operation of the exposure device 5 and/or of the entire apparatus 1. The detection device 11 is in detecting an entering of laser radiation into a process chamber limiting element at least partially limiting the process chamber 10 and/or in detecting a penetration of laser radiation through a process chamber limiting element at least partially limiting the process chamber 10 provided for generating detection information and for communicating this to the control device 15. Both regarding the detection device 11 and regarding the control device 15, suitable communication interfaces (not shown) are present, enabling a transfer of detection information from the detection device 11 to the control device 15.

The control device 15 is provided to, on receipt of the respective detection information, (instantly) perform at least one action to prevent the laser radiation from entering into the process chamber limiting element at least partially limiting the process chamber 10 and/or to prevent the laser radiation from at least partially penetrating the process chamber limiting element at least partially limiting the process chamber 10. An appropriate action can be to reduce the performance of the laser radiation generated by the exposure device 5, or to switch off the exposure device 5, or to switch off the entire apparatus 1.

Finally, it applies to all exemplary embodiments that the detection device 11 can communicate with an output device 16 for outputting information, to a user, wherein the detection device 11, in detecting an entering of laser radiation into a process chamber limiting element at least partially limiting the process chamber 10 and/or in detecting a penetration of laser radiation through a process chamber limiting element at least partially limiting the process chamber 10, is provided for generating detection information and for communicating this to the output device 16. The detection device 11 and/or the output device 16 can be provided to generate warning information relating to the detection information and to output it to a user.

An output of respective information can be understood as a direct output of, especially acoustic and/or optical, signals relating to the respective information to a user, for what the apparatus 1 has suitable signal output devices 17, i.e., for example, display devices, speaker devices, etc. An output of respective information can also be understood as an, especially radio-based, transfer of respective information to at least one user (mobile) end device 19, i.e., for example, a computer, a mobile phone, a smart phone, a tablet computer, etc., for what the apparatus 1 has suitable data transfer interfaces 18, i.e., for example, transmitting devices.

The invention claimed is:

1. An apparatus for additive manufacturing of three-dimensional objects by successive, selective layer-by-layer laser radiation causing successive, selective layer-by-layer solidification of construction material layers of a construction material in a process chamber, the apparatus comprising:

one or more process chamber limiting elements at least partially limiting the process chamber, wherein at least one of the one or more process chamber limiting elements comprises a process chamber window element enabling viewing into the process chamber;

an exposure device that generates laser radiation for selective exposure of respective construction material layers; and a detection device comprising at least one detection element that detects a secondary laser radiation reflected from a construction plane that enters and/or penetrates through the process chamber window element, wherein the process chamber window element comprises a multi-layered design comprising two external layers, and wherein the at least one detection element is disposed between the two external layers.

2. The apparatus of claim 1, wherein the at least one detection element detects a physical property that is at least partially changeable related to such secondary laser radiation.

3. The apparatus of claim 1, wherein the at least one detection element detects an atmosphere that is changeable by material removal of the process chamber limiting element related to such secondary laser radiation.

4. The apparatus of claim 1, wherein the at least one detection element detects particles resulting from a material removal of the process chamber limiting element related to such secondary laser radiation.

5. The apparatus of claim 1, wherein at least one additional detection element is disposed on the process chamber window element.

6. The apparatus of claim 5, wherein the at least one additional detection element is disposed on an inner surface of the process chamber limiting element facing the process chamber.

7. The apparatus of claim 5, wherein the at least one additional detection element is disposed on an outer surface of the process chamber limiting element facing away from the process chamber.

8. The apparatus of claim 1, wherein at least one additional detection element is disposed in a carrying structure.

9. The apparatus of claim 8, wherein the carrying structure is disposed on the process chamber window element.

10. The apparatus of claim 8, wherein the carrying structure is disposed in the process chamber window element.

11. The apparatus of claim 1, wherein the detection device communicates with a control device controlling the operation of the exposure device of the apparatus.

12. The apparatus of claim 1, wherein the detection device communicates with an output device for outputting information.

* * * * *